US 6,705,156 B2

(12) United States Patent
Shteinhauz et al.

(10) Patent No.: US 6,705,156 B2
(45) Date of Patent: Mar. 16, 2004

(54) CROSS-CORRELATION METHOD FOR IDENTIFICATION AND REMOVAL OF MACHINE CONTRIBUTION FROM TIRE UNIFORMITY MEASUREMENTS

(75) Inventors: Gregory David Shteinhauz, Akron, OH (US); Yiu Wah Luk, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 57 days.

(21) Appl. No.: 10/137,265

(22) Filed: May 2, 2002

(65) Prior Publication Data

US 2003/0205080 A1 Nov. 6, 2003

(51) Int. Cl.$^7$ .................... G01M 17/02; B24B 49/00
(52) U.S. Cl. ................ 73/146; 451/254; 702/75
(58) Field of Search ............... 73/146, 146.2, 73/146.3, 146.4, 146.5, 146.8; 702/75, 84; 451/10, 8

(56) References Cited

U.S. PATENT DOCUMENTS

| | | | | | |
|---|---|---|---|---|---|
| 5,396,438 A | * | 3/1995 | Oblizajek | ............ | 702/84 |
| 6,035,709 A | * | 3/2000 | Barnette, Jr. | ............ | 73/146 |
| 6,065,331 A | * | 5/2000 | Fukasawa | ............ | 73/146 |
| 6,086,452 A | * | 7/2000 | Lipczynski et al. | ............ | 451/5 |
| 6,139,401 A | * | 10/2000 | Dunn et al. | ............ | 451/10 |
| 6,257,956 B1 | * | 7/2001 | Shteinhauz et al. | ............ | 451/8 |
| 6,584,877 B1 | * | 7/2003 | Poling et al. | ............ | 82/101 |
| 6,609,074 B2 | * | 8/2003 | Shteinhauz | ............ | 702/75 |

* cited by examiner

Primary Examiner—Edward Lefkowitz
Assistant Examiner—Andre J. Allen
(74) Attorney, Agent, or Firm—Howard M. Cohn

(57) ABSTRACT

Method to identify and remove machine contributions from tire uniformity measurements made on a tire uniformity machine by synchronizing and averaging together multiple measurements of tire uniformity made on a single test tire that is re-mounted between measurements in a randomly determined orientation relative to a rim reference mark on the rim of the tire uniformity machine. A cross-correlation function is calculated for each measurement relative to the first measurement, and an angular shift is determined from each cross-correlation function. The angular shifts are used to synchronize the measurements so that they can be averaged together. The resulting average test tire uniformity data has both machine contribution and random measurement noise minimized. An average machine contribution data set is determined by synchronizing and subtracting the average test tire uniformity data from each test tire uniformity measurement data set, then averaging together the resulting data sets. Corrected production tire uniformity data is obtained from a single measurement of production tire uniformity by subtracting the average machine contribution data from the production tire uniformity measurement data.

20 Claims, 4 Drawing Sheets

CROSS-CORRELATION METHOD FOR IDENTIFICATION AND REMOVAL OF MACHINE CONTRIBUTION FROM TIRE UNIFORMITY MEASUREMENTS

TECHNICAL HELD

The present invention generally relates to the measurement of tire uniformity with a tire uniformity machine, and more specifically to the removal of the erroneous contributions of the tire uniformity machine to the tire uniformity measurement signals.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of a sufficient magnitude will cause force variations on a surface, such as a road, against which the tires roll producing vibration and noise. When such variations exceed an acceptable maximum level, the ride and handling of a vehicle utilizing such tires will be adversely affected.

Tire uniformity machines are used to monitor the quality of the tire production process and may guide or incorporate corrective measures such as grinding to improve the balance and uniformity of a tire. In general, a tire uniformity machine subjects a tire to normal conditions of mounting, pressurization, rotation and load while collecting measurement data on variations of deflection, force, and velocity. A tire uniformity machine (TUM) typically includes an assembly for rotating a tire against the surface of a rotating loading wheel. In this testing arrangement, the loading wheel is acted upon in a manner dependent on the forces exerted by the rotating tire. Resulting deflections, force variations and velocities are measured by appropriately placed measuring devices. When a tire being tested yields unacceptable results, shoulder and/or center rib grinders are used to remove a small amount of the tire tread at precisely the location of the non-uniformities detected by the measuring devices. In a sophisticated tire uniformity machine the measurements are stored and interpreted in digital form by a computer, and rubber is removed from the tire tread using grinders controlled by the computer. Examples of machines utilizing these methods are disclosed in U.S. Pat. Nos. 3,739,533; 3,946,527; 4,914,869 and 5,263,284.

Unavoidably, fire uniformity machines are not themselves perfectly uniform, and so tire uniformity measurement signals may include an erroneous contribution from the tire uniformity machine itself. In effect, minor variations in the design, construction and operation of a tire uniformity machine contribute to variations of deflection, force or velocity that contaminate the tire uniformity measurements with a "machine contribution." In general, tire uniformity machines are designed, manufactured and operated to minimize the machine contribution to the tire uniformity measurement data. However, there are technical and cost limitations to the precision and care with which a tire uniformity machine can be built and operated such that some machine contribution is inevitable. The prior art provides a variety of examples addressing methods to avoid and correct tire uniformity measurement errors.

As noted by U.S. Pat. No. 4,404,848 ('848), it is often the case that measured values contain errors due to rotational deflections of the rims that grip the inspected tire and/or the load wheel of the tire uniformity machine. In addition, small deflections occur due to the deterioration of parts, by rust or by bruises which are developed during use of the inspecting machines. A method to correct these types of errors is disclosed by the '848 patent wherein the radial runout of the load wheel is measured without a tire in place to obtain an erroneous deflection signal. The erroneous deflection signal is then multiplied by the spring constant of the measured tire and subtracted from the measured value of the radial force obtained from the tested tire.

U.S. Pat. No. 4,404,849 describes a method for correcting errors of measurement due to variations in tire pressure in a tire uniformity inspecting operation.

U.S. Pat. No. 5,614,676 ('676) describes a method of vibration analysis for tire uniformity machines by using signals from load cells when the machine idles. The signals are sent to a computer that outputs an alarm signal when the amplitude of vibration at selected frequencies exceeds acceptable levels.

Since complete elimination of defects and imperfections of the tire uniformity machine is difficult, it is more practical to measure and then remove the machine contribution from tire uniformity machine measurement signals, thereby improving the quality of the tire uniformity machine measurements which, in turn, improves the efficiency of corrective actions based on those measurements. So there is a need for improved methods to monitor and compensate for these inevitable machine contributions.

SUMMARY OF THE INVENTION

The present invention relates to a method for correcting errors of measurement made on tire uniformity machines by removing machine contributions from tire uniformity measurements.

The invention comprises a method to identify and remove a machine contribution from tire uniformity measurements made on a tire uniformity machine which subjects a tire to normal conditions of mounting, inflation, load and rotational speed while measuring and collecting tire uniformity measurement data with respect to a rim reference mark, the method characterized by the steps of:

step 1: mounting a tire on the tire uniformity machine at a random angular position with respect to the rim reference mark;

step 2: collecting tire uniformity data to record a first measurement of uniformity data set;

step 3: re-mounting the same tire on the tire uniformity machine at a random angular position with respect to the rim reference mark;

step 4: collecting tire uniformity data to record a repeated measurement of uniformity data set;

step 5: determining if additional measurements of uniformity are required for the tire, then looping back to repeat steps 3 through 5 if additional measurements of uniformity are determined to be required, but proceeding to step 6 when it is determined that additional measurements of uniformity are not required;

step 6: calculating cross-correlation functions and using them to determine angular shifts between the first measurement data set and each of the repeated measurement data sets;

step 7: using the angular shifts to synchronize each repeated measurement data set with the first measurement data set to yield synchronized measurement of uniformity data sets; and step 8: averaging together the first measurement of uniformity data and all of the synchronized measurement of uniformity data sets to yield an average tire uniformity data set that has minimized both random measurement noise and machine contribution errors in the measurement of uniformity data for the tire.

According to invention, the step 5 is further characterized by determining a required quantity of additional measurements of uniformity for the tire by quantifying and using knowledge of a random variability of tire uniformity measurements through statistical analysis of multiple repeated measurements of tire uniformity on the tire uniformity machine. Alternatively, the step 5 is further characterized by determining a required quantity of additional measurements of uniformity for the tire by specifying the required quantity as a fixed quantity in the range of 20 to 50.

Also according to the invention, the method comprising steps 1 through 8 is further characterized by storing and interpreting the measurement of uniformity data, performing calculations, and processing corrective actions in digitized forms in an arithmetic operation circuit.

According to invention, the method comprising steps 1 through 8 may be characterized in that the steps 1 through 8 are performed using a test tire for the tire, the test tire being selected to be representative of a group of tires to be measured on the tire uniformity machine. The method then comprises the additional steps of:

step 9: using the angular shifts to synchronize the average test tire uniformity data set with each of the repeated measurement of uniformity data sets, and then subtracting to determine the machine contribution in each test tire measurement of uniformity data set to yield machine contribution data sets;

step 10: averaging together all of the machine contribution data sets to yield an average machine contribution data set for the test tire;

step 11: mounting a group tire from the group of tires on the tire uniformity machine at a random angular position with respect to the rim reference mark;

step 12: collecting tire uniformity data to record a group tire measurement of uniformity data set; and step 13: subtracting the average machine contribution data set from the group tire measurement of uniformity data set, thereby determining a corrected group tire uniformity data set for the group tire which is free of machine contribution.

According to the invention, the method comprising steps 1 through 13 is further characterized wherein the step 5 includes determining a required quantity of additional measurements of uniformity for the test tire by quantifying and using knowledge of a random variability of tire uniformity measurements through statistical analysis of multiple repeated measurements of tire uniformity on the tire uniformity machine. Alternatively, the step 5 includes determining a required quantity of additional measurements of uniformity for the test tire by specifying the required quantity as a fixed quantity in the range of 20 to 50.

Also according to the invention, the method comprising steps 1 through 13 is further characterized by storing and interpreting the measurement of uniformity data, performing calculations, and processing corrective actions in digitized forms in an arithmetic operation circuit.

According to the invention, the step 6 is further characterized by determining each angular shift from a rotational angle of a peak position of each cross-correlation function.

According to the invention, the method comprising steps 1 through 13 is further characterized by storing the average machine contribution data set that was determined for the test tire; and determining corrected group tire uniformity data sets for additional group tires by repeating for each additional group tire a series of steps comprising the step 11, the step 12, and the step 13. Preferably, the group tire is one in a group of production tires, and the test tire is selected from the group of production tires. Also preferably, the method is further characterized by the step of periodically re-determining the average machine contribution data by selecting the test tire from a current group of production tires; and by repeating a group of steps comprising the step 1 through the step 10.

According to the invention, the method comprising steps 1 through 13 is further characterized by selecting the test tire such that it has the same tire construction as the group of tires to be measured on the tire uniformity machine.

An alternative embodiment of the invention comprises a method for accurately determining a machine contribution of error in tire uniformity measurements made on a tire uniformity machine which subjects a tire to normal conditions of mounting, inflation, load and rotational speed while measuring and collecting tire uniformity measurement data with respect to a rim reference mark, the method characterized by the steps of:

step 1: mounting a tire on the tire uniformity machine at a random angular position with respect to the rim reference mark;

step 2: collecting tire uniformity data to record a first measurement of uniformity data set;

step 3: re-mounting the same tire on the tire uniformity machine at a random angular position with respect to the rim reference mark;

step 4: collecting tire uniformity data to record a repeated measurement of uniformity data set;

step 5: determining if additional measurements of uniformity are required for the tire, then looping back to repeat steps 3 through 5 if additional measurements of uniformity are determined to be required, but proceeding to step 6 when it is determined that additional measurements of uniformity are not required;

step 6: calculating cross-correlation functions and using them to determine angular shifts between the first measurement data set and each of the repeated measurement data sets;

step 7: using the angular shifts to synchronize each repeated measurement data set with the first measurement data set to yield synchronized measurement of uniformity data sets;

step 8: averaging together the first measurement of uniformity data and all of the synchronized measurement of uniformity data sets to yield an average tire uniformity data set that has minimized both random measurement noise and machine contribution errors in the measurement of uniformity data for the tire;

step 9: using the angular shifts to synchronize the average tire uniformity data set with each of the repeated measurement of uniformity data sets, and then subtracting to determine the machine contribution in each tire measurement of uniformity data set to yield machine contribution data sets; and step 10: averaging together all of the machine contribution data sets to yield an average machine contribution data set for the tire, wherein tire uniformity data has been subtracted out, and random measurement noise has been averaged out to yield a data set that accurately represents the machine contribution of error in tire uniformity measurements performed on the tire uniformity machine.

According to the invention, the steps in the alternative embodiment method are performed using a test tire for the tire, the test tire being selected to be representative of a group of tires to be measured on the tire uniformity machine; preferably selecting the test tire such that it has the same tire construction as the group of tires to be measured on the tire uniformity machine.

According to the alternative embodiment of the invention the step 5 is further characterized by determining a required quantity of additional measurements of uniformity for the tire by quantifying and using knowledge of a random variability of tire uniformity measurements through statistical analysis of multiple repeated measurements of tire uniformity on the tire uniformity machine. Alternatively, a required quantity of additional measurements of uniformity for the tire is determined by specifying the required quantity as a fixed quantity in the range of 20 to 50.

According to the alternative embodiment of the invention, the method is further characterized by storing and interpreting the measurement of uniformity data, performing calculations, and processing corrective actions in digitized forms in an arithmetic operation circuit.

Other aspects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
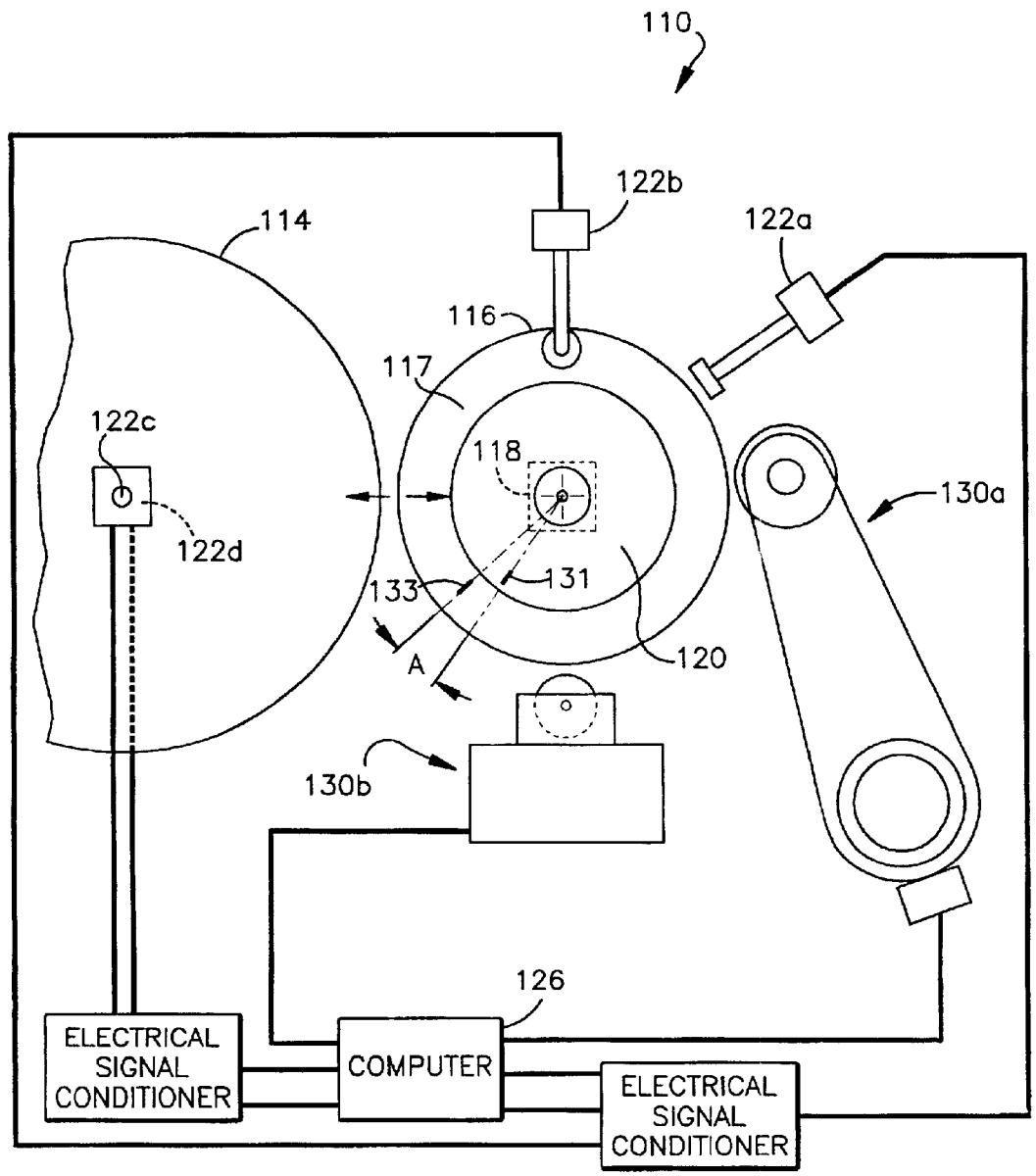

Elements of the figures are typically numbered as follows. The most significant digits (hundreds) of the reference number corresponds to the figure number wherein the element is first introduced. Thus, elements introduced in FIG. 1 are typically numbered in the range of 100–199, elements introduced in FIG. 2 are typically numbered in the range of 200–299, and so on. Similar elements throughout the drawings may be referred to by similar reference numerals. For example, the element 199' is similar to, but modified in some way compared to the element 199 in the same or another figure. Alternatively, for example, each of a plurality of elements 199 may be referred to individually as 199a, 199b, 199c, etc. Such relationships, if any, between similar elements in the same or different figures will become apparent throughout the specification, including, if applicable, in the claims and abstract.

Figure 2A:
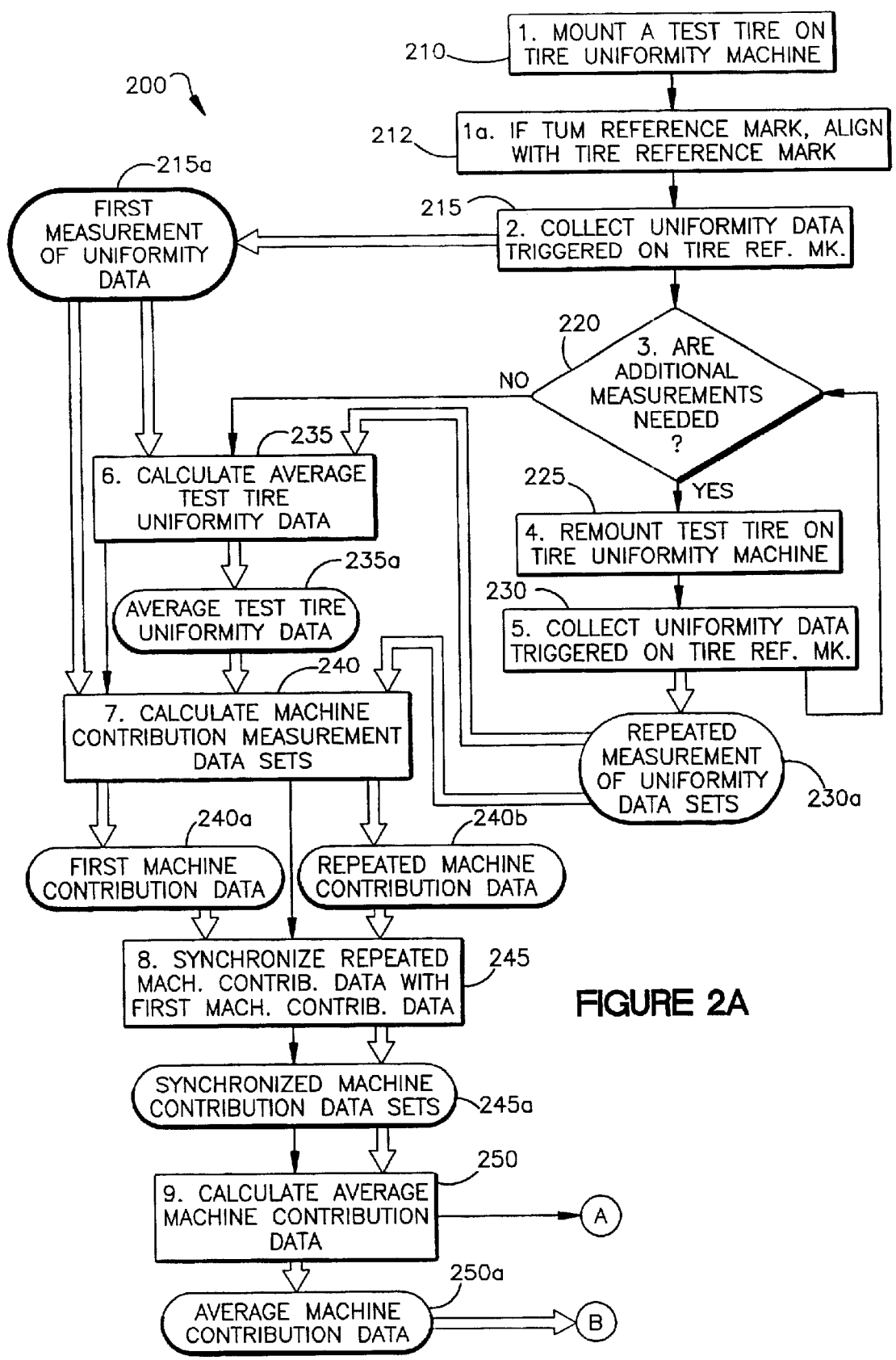
Figure 2B:
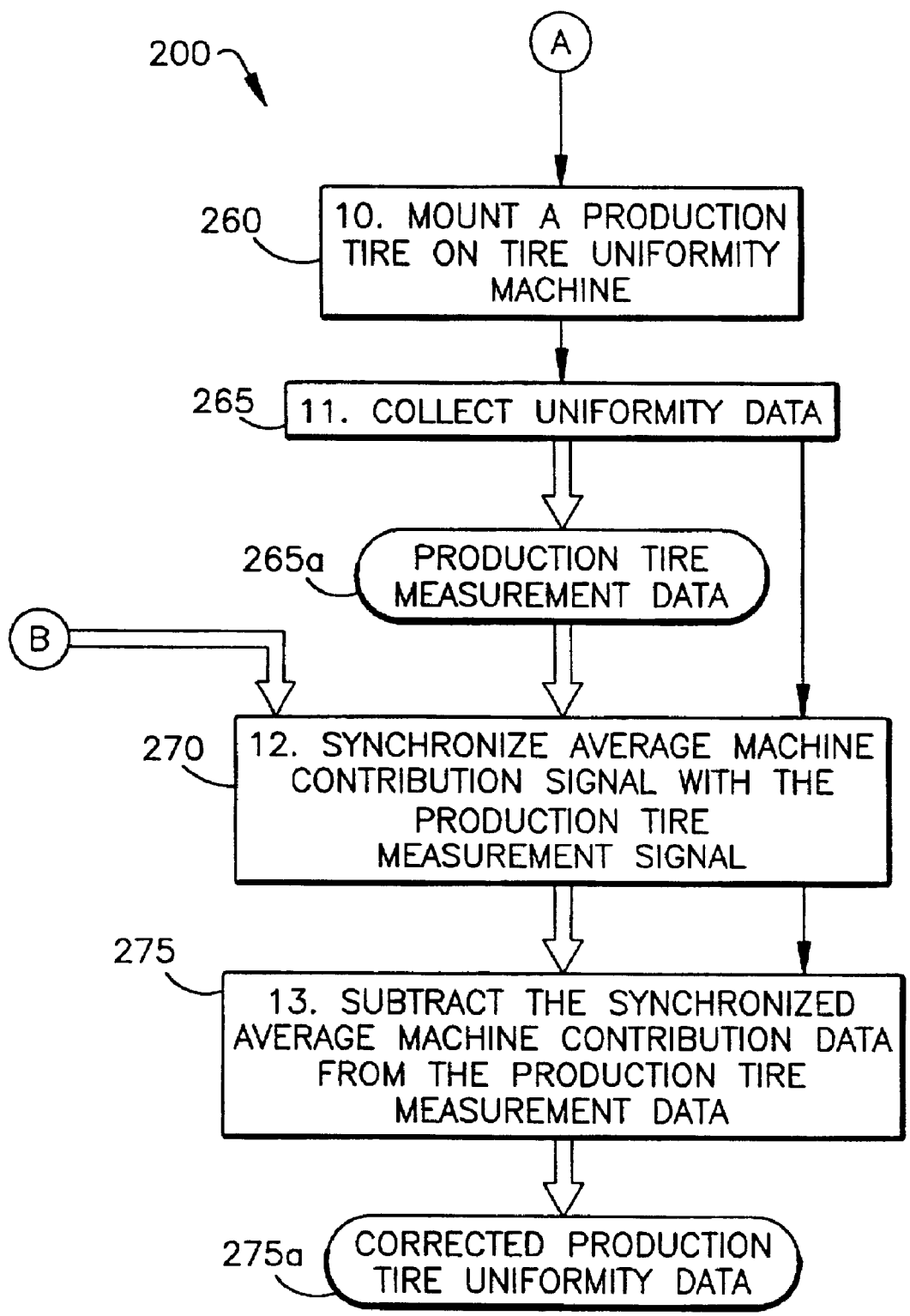
Figure 3A:
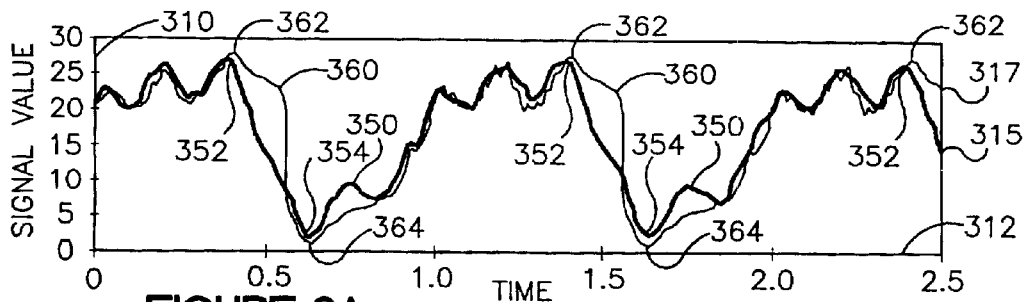
Figure 3B:
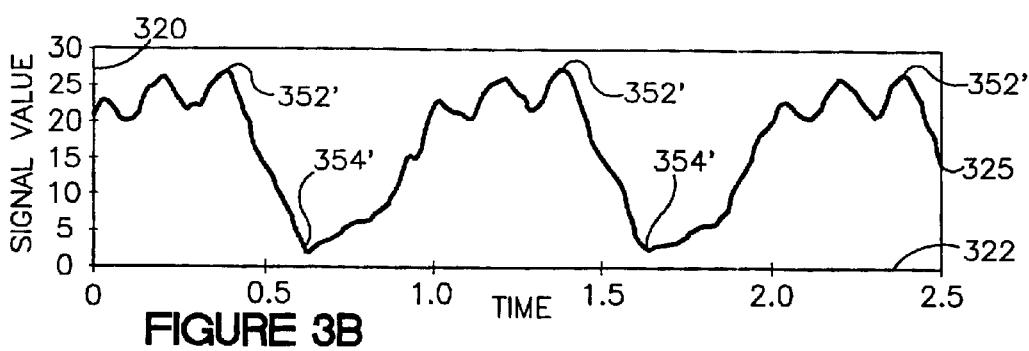
Figure 4A:
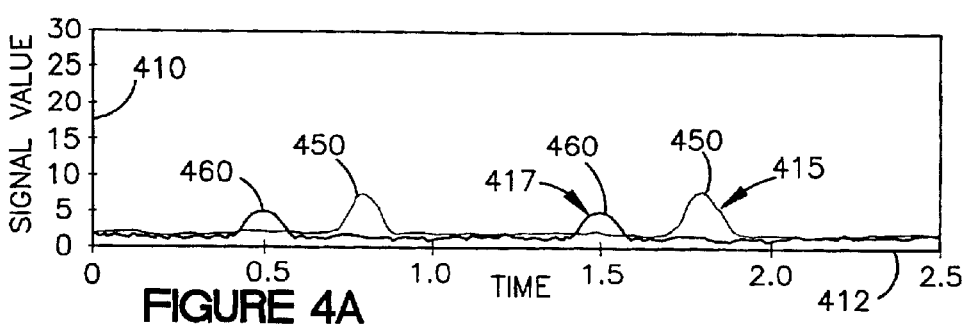
Figure 4B:
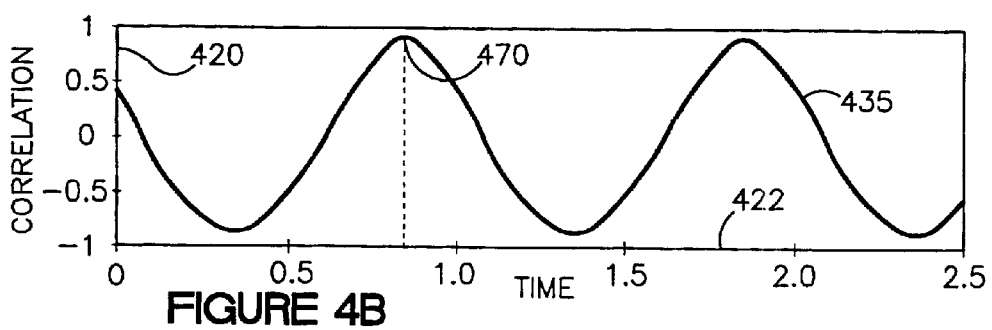
Figure 5:
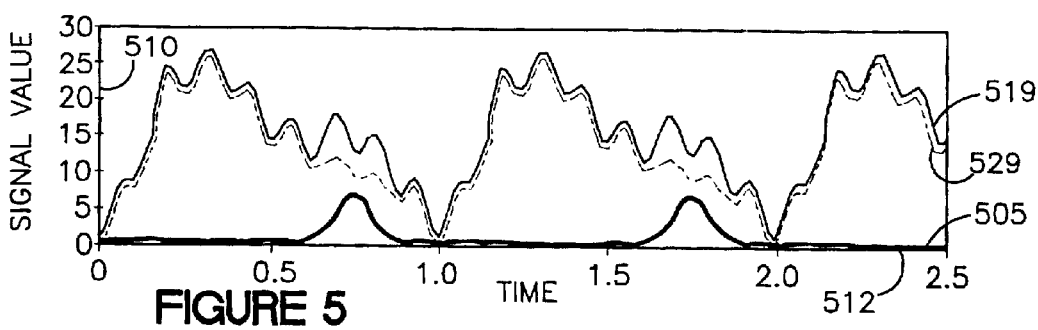

The structure, operation, and advantages of the present preferred embodiment of the invention will become further apparent upon consideration of the following description taken in conjunction with the accompanying drawings, wherein:

FIG. 1 is a representative view of a tire uniformity machine (TUM) with a tire mounted thereon in accordance with the present invention;

FIGS. 2A, 2B and 2C together constitute a flow diagram illustrating a procedural implementation of the present invention;

FIG. 3 illustrates signals for a first (315) and a second (317) measurement of uniformity for a test tire randomly mounted at different angular positions on the rim of the TUM in accordance with the present invention;

FIG. 4 illustrates a cross correlation function calculated between the two signals of FIG. 3, and used to determine an angular shift between the two signals in accordance with the present invention;

FIG. 5 illustrates the two signals of FIG. 3 wherein the second signal is shifted by the amount of the angular shift of FIG. 4, thereby synchronizing the two signals in accordance with the present invention;

FIG. 6 illustrates an average test tire uniformity data signal obtained by time domain averaging of a plurality of synchronized measurement of uniformity data sets such as the two synchronized signals of FIG. 5, thereby averaging out a machine contribution in accordance with the present invention;

FIG. 7 illustrates the average test tire uniformity data signal of FIG. 6 synchronized with the first measurement signal of FIG. 3 in accordance with the present invention;

FIG. 8 illustrates a machine contribution data set signal obtained by subtracting the average test tire uniformity data signal from the first measurement signal when the two signals are synchronized as shown in FIG. 7, in accordance with the present invention;

FIG. 9 illustrates an average machine contribution data signal obtained by repeating the operations illustrated in FIGS. 7 and 8 for all of the plurality of synchronized measurement of uniformity data sets, and then averaging together all of the resulting machine contribution data sets in accordance with the present invention; and FIG. 10 illustrates the first measurement of uniformity signal of FIG. 3 and a corrected tire uniformity data signal obtained by subtracting the average machine contribution data signal of FIG. 9 from the first measurement signal in accordance with the present invention.

DEFINITIONS

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Belt Structure" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure and tread, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cross correlation function" means a mathematical tool for the comparative analysis of two sets of periodic or cyclical data (such as repeated measurements of a rotating tire made on a tire uniformity machine) wherein the analysis provides a determination of the time shift between the two sets of periodic data. If the cyclical data is recorded versus rotational angle, then the time shift is transformed to a corresponding rotational angular shift.

"Cyclical data" means data having repeating characteristics with a regular periodic frequency or time interval.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Lateral" means a direction going from one sidewall of the tire towards the other sidewall of the tire, generally across the tread perpendicular to the tire circumference.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead and are laid at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Time shift" means an adjustment in the time base of a first set of cyclical data in order to synchronize the first set of cyclical data with a second set of cyclical data.

"Tread" means the ground contacting portion of a tire.

DETAILED DESCRIPTION OF THE INVENTION

Referring now to the drawings, which are for purposes of illustrating a preferred embodiment of the invention only, and not for purposes of limiting the invention, FIG. 1 shows a schematic of a tire uniformity machine (TUM) 110 used to measure forces, primarily, but also velocities and displacements, all of which are generated by tire non-uniformity. A load wheel 114 applies a load to a tire 116 mounted on a rim 120 that is rotated by a drive motor 118. One or more sensors 122 (122a, 122b, 122c, 122d) measure the lateral, tangential, and radial forces exerted by the tire 116. Lateral forces occur perpendicular to the plane in which the tire 116 rotates. Tangential forces act tangentially to the tire's circumference. Radial forces act parallel to a radius of the tire 116. The measurements are made electronically by the tire uniformity machine 110 and then converted to force measurements (or velocity, displacement, etc). There may be a rim reference mark 131 on the rim 120, and/or there may be a tire reference mark 133 on a sidewall 117. When the tire 116 is mounted on the rim 120, an angle "A" will be defined between the tire reference mark 133 and the rim reference mark 131. The angle A may be purposely adjusted to be zero degrees, but the tire 116 is most generally randomly mounted to yield a random value for the angle A. The individual uniformity measurement data points are collected as the tire 116 mounted on the rim 120 rotates through 360 degrees (and beyond for multiple rotations). The angular location of the tire 116, usually determined by sensing a reference mark (either the tire reference mark 133 or the rim reference mark 131), is used to index the measurement data points, such that a uniformity measurement signal is formed that comprises a series of data points referenced to tire angular locations. Uniformity measurement signals are preferably transferred to a computer 126 for analysis and possible storage. The tire uniformity measurements are an indicator of tire quality related to uniformity, and can be used to accept or reject the measured tire based on predetermined quality criteria. Optional grinders 130 (130a, 130b) can be incorporated in the fire uniformity machine 110 in order to correct the tire 116 uniformity, thereby improving its quality, by grinding as determined by the computer 126 which utilizes the uniformity measurements.

The method of this invention is described in a preferred embodiment, which utilizes an unspecified one of various ones of the tire uniformity machine 110 uniformity force measurements. The description herein refers to a generalized uniformity force measurement without reference to a specific physical measurement of uniformity, but the method of this invention is considered to be applicable to all measurements of tire uniformity including, but not limited to: radial force and/or displacement, lateral force and/or displacement, conicity, tangential forces, and angular velocity variation of the tire 116 and load wheel 114. A complete application of the method of this invention is intended to include one or more of these usual measurements of uniformity, with the measurements being conducted essentially simultaneously using multiple sensors 122, resulting in multiple sets of measurement data, one set per measurement type. As is known, each tire uniformity machine 110 measurement data set is produced by a sensor 122 which outputs a time-related series of readings. The first reading in a series is assumed to be at a time "0" (zero) which the tire uniformity machine 110 causes to occur at a particular angular location, designated as zero degrees, of the tire 116 or of the rim 120 which is holding the tire 116 being measured. This particular angular location is generally defined by the reference mark 131 (generally part of the rim 120) which is sensed by the TUM controller (usually computer 126) and then used to trigger the time zero start of tire uniformity measurements. The complete set of readings from the measurement time of a tire 116 constitute a set of measurement of tire uniformity data, or a measurement data set, which is also called a measurement signal, especially when individual data points of the measurement data set are plotted versus time (or degrees of angular rotation which can be correlated with time). Therefore, in the description herein, the terms "signal", "data", and "data set" will be used interchangeably to refer to a series of tire uniformity measurement data points.

Commonly-owned U.S. Pat. No. 6,257,956 discloses a method of identifying and removing machine contribution errors from TUM measurements by measuring the uniformity of a tire (e.g., 116) of known good uniformity. Preferably multiple measurements are made on the same tire 116, all triggered by a rim reference mark 131 on the rim 120, and before each of the multiple measurements the tire 116 is removed and re-mounted in a random orientation with respect to the rim reference mark 131. By averaging together the multiple measurements into an average measurement signal, any remaining uniformity defects in the tire 116 of known good uniformity are averaged out to an acceptably low level so that what remains in the average measurement signal is an average machine contribution signal. The average machine contribution signal can be subtracted from subsequent production tire uniformity measurement signals to improve their accuracy.

The present invention is directed to a less restricted method of determining machine contribution wherein the inventive method does not require the use of a test tire 116 of "known good uniformity". The method of the present invention uses multiple measurements on a test tire 116 to first determine a clean tire-only average test tire uniformity data signal. Then the tire-only signal is synchronized with, and subtracted from all of the multiple measurements in order to determine an average machine contribution data signal.

A prerequisite for the method of this invention is that the computer (e.g., 126) which is recording the tire uniformity measurements of the test tire 116 must be capable of triggering the time zero start of measurements off of a reference mark 131 which is on the rim 120. It is within the scope of this invention that the computer 126 utilized for the test tire 116 uniformity measurements is not the computer which is normally part of the tested TUM 110. For example, the computer 126 could be a portable computer, optionally with its own sensor (not shown) for detecting the rim mark 131, and this portable computer 126 could be removably connected to the TUM measurement sensors (e.g., 122) and other sensors and actuators as needed to conduct the tire uniformity measurements on the test tire 116 as described in the inventive method hereinbelow. Once the portable computer 126 has completed test measurements on the test tire 116 and subsequently calculated average machine contribution data, the portable computer can be removed from the tested TUM 110. The inventive method of correcting tire uniformity measurements can then be utilized by a suitably configured tire uniformity machine computer 126. The prerequisite for the inventive method is the availability of the rim reference mark 131 on rim 120, which is usually available on the TUM machines.

The preferred embodiment of the inventive method 200 will be described for implementation with tire uniformity measurements that are performed on a group of "production tires", meaning tires 116' that are part of a production run of tires all having the same tire construction, often being produced in series and then measured "in line" while progressing through the final stages of tire production. It should be understood that the inventive method 200 is not restricted to production tires. For example, another embodiment of the method 200 could easily be applied to any group of tires for which tire uniformity testing is desired, as long as the group tires all have tire constructions that are similar enough to each other that they will perform similarly when measured on one particular TUM 110 with one set of moving parts (e.g., rim 120) and one setup.

The flow chart of FIGS. 2A, 2B and 2C (collectively referred to as FIG. 2) illustrates the steps in a preferred method 200 of the present invention. In the following detailed description, FIGS. 3–10 will also be referenced as appropriate. The FIGS. 3–10 illustrate graphs of various data signals exemplary of signals that may be determined by the measurements and calculations of the disclosed method steps. The graphs of FIGS. 3–10 are all shown with a horizontal axis 312 that is marked with degrees of rotational angle of the TUM rim 120 (and therefore of the tire 116 mounted on the rim 120) wherein zero degrees is defined to occur when the rim reference mark 131 is detected. Of course normal TUM procedures are used wherein the tire uniformity measurements are not recorded until after test conditions are met including, for example, the tire 116 is warmed up and rotating at a stable average rotational velocity. The vertical axis 310 of FIGS. 3, and 5–10 is marked with signal values representing relative magnitude of the tire uniformity measurement data points in the plotted signal. FIG. 4 illustrates a different graph showing the results of a cross correlation function calculation, therefore the vertical axis 411 of FIG. 4 is marked according to a scale of correlation value.

In step 1 (210), a test tire 116 is mounted in a tire uniformity machine 110. The test tire 116 may be of any reasonable quality, and may even be known to have one or more non-uniformities, as long as the amount of non-uniformity is within the limits of normal corrective action, as determined by one skilled in the art of tire uniformity testing. The test tire 116 is selected to be representative of a group of similar tires which will be measured on the tested TUM 110. Preferably, the group of similar tires all have the same tire construction. The test tire 116 is mounted on the rim 120 without regard to the angular position of the test tire 116 relative to the rim reference mark 131. In other words, the tire 116 is mounted at a random angular position with respect to the rim reference mark 131. If there is a tire reference mark 133, then the angular position of the test tire 116 will be the angle A as illustrated in FIG. 1. However it is not necessary to have a tire reference mark 133, and the magnitude of the angle A does not need to be noted for the present method 200. In step 2 (215), the tire uniformity machine 110 is operated to collect a first set of uniformity data 215a for the test tire. The uniformity data 215a is collected in the usual way with the time zero (rotational angle 0°) measurement being triggered by the rim reference mark 131.

Tire uniformity data (e.g., 215a) for a tire 116 is collected as data, typically stored in a computer 126, which represents a set of measurements by a sensor 122 over a period of time sufficient to include multiple 360° rotations of the tire 116. The uniformity of the tire 116 is indicated by the variation in signal value of the measurement data points collected over the period of time. Such a set of time-dependent measurements (data) may also be referred to as a measurement signal. An example of a first measurement signal 215a from a test tire 116 is illustrated by the curve 315 in FIG. 3. The first measurement of uniformity data 215a is stored in digital form for further analysis.

In step 3 (220), the test tire 116 is removed and then remounted on the rim 120 in a random angular position with respect to the rim reference mark 131, thereby producing is random values for the angle A of each repeated measurement.

In step 4 (225), the tire uniformity machine 110 is operated to collect a repeated measurement of uniformity data set 225a for the test tire 116, with the time zero measurement still triggered by the rim reference mark 131. An example of a repeated tire uniformity measurement signal 317 resulting from the data 225a for the test tire 116 (e.g., using data from a second measurement) is illustrated by a curve 317 in FIG. 3. Note that the first measurement signal 315 and the second measurement signal 317 have similar but not identical shapes, and are shifted with respect to each other due to the random angular positions of the tire on the rim in each measurement. An examination of the waveform of the signals 315, 317 reveals features that repeat every 360°, such as maximum signal values 352, 362, respectively, and such as minimum signal values 354, 364, respectively. Since these features 352/362 and 354/364 are similar in the two signals 315, 317, but are shifted to different rotational angles, it is reasonable to assume that these features 352/362 and 354/364 are mainly representative of non-uniformities in the test tire 116. The present invention makes this assumption, and furthermore assumes that the angular location of these features 352/362 and 354/364 is an indication of the angular location of the test tire 116 for each of the tire uniformity measurement data sets 215a, 225a.

Step 5 (230) is a decision step wherein it is determined whether additional (repeat) measurements of uniformity are required for the test tire. If the outcome of the decision is "yes", then steps 3 (220) and 4 (225) are performed while looping back again to the decision step 5 (230): i.e., the test tire 116 is remounted 220, and another repeated measurement of uniformity data 225a is collected 225. Each repeated measurement of uniformity data set 225a is stored separately in digital form for further analysis. The decision about needing additional measurements may be determined by a statistical procedure such as an analysis of variance of the measurement of uniformity data sets 215a, 225a collected so far in order to quantify the random variability of the data. Alternatively, the number of repetitions may be specified as a fixed number to simplify the procedure for routine implementation on the factory floor. For example, previous statistical analysis may have shown that approximately repeated measurements of a randomly remounted test tire will generally provide sufficient data for the calculation of a representative, or average, machine contribution signal according to the method 200 of the present invention. In general, the number of repeated measurements of uniformity (step 4 (225)) is expected to be in a range from approximately 20 to approximately 50 repetitions.

When the decision step 5 (230) has determined that no more additional measurements are needed, the process 200 proceeds to step 6 (235), wherein a cross-correlation function is calculated between the first measurement of uniformity data 215a and each of the repeated measurement of uniformity data sets 225a. FIG. 4 illustrates an exemplary cross correlation function 470 that was calculated between the first measurement of uniformity data 215a (first measurement signal 315 illustrated in FIG. 3) and a repeated measurement of uniformity data set 225a constituting the second measurement signal 317 illustrated in FIG. 3. Each point at an angle $A_2$ (not shown) of the correlation function 470 is the result of a calculation that determines how well the second measurement signal 317 matches (correlates with) the first measurement signal 315 when the second measurement signal 317 is shifted by $A_2$ degrees relative to the first measurement signal 315. The maximum correlation, illustrated by a peak 472, occurs at an angular shift $AS_2$. It can be seen in FIG. 3 that the magnitude of the angular shift $AS_2$ is approximately the same as the difference in rotational angles between major features of the signals 315 and 317 (e.g., the angular shift between peaks 352 and 362, or between valleys 354 and 364). In other words, shifting the second measurement signal 317 by $AS_2$ degrees will align it with the first measurement signal 315, thereby synchronizing the two sets of measurement data 215a, 225a.

Thus, the result of the cross-correlation function calculations of step 6 (235) is angular shift data 235a, wherein the angular shift (e.g., $AS_2$) with respect to the first measurement of uniformity data set 215a is determined for each repeated measurement of uniformity data set 225a.

In step 7 (240), the angular shift data 235a is used to synchronize each of the repeated measurement of uniformity data sets 225a with the first measurement of uniformity data set 215a, resulting in a new group of synchronized measurement of uniformity data sets 240a, which are all aligned and in phase with the first measurement of uniformity data set 215a (i.e., synchronized). For example, FIG. 5 illustrates the first measurement signal 315 and a synchronized second measurement signal 317' comprising the second measurement signal 317 shifted by the angular shift $AS_2$ so that it is aligned with the first measurement signal 315. Although major features of the two signals 315, 317' are aligned, there are minor magnitude differences between the signals 315, 317'. These magnitude differences are assumed to be due to measurement "noise" and to machine contribution effects.

In step 8 the first measurement of uniformity data set 215a and all of the synchronized measurement of uniformity data sets 240a are averaged together to determine an average test tire uniformity data set 245a. Point-by-point averaging is used wherein a signal value at a rotational angle φ of the first measurement data 215a is averaged together with signal values at the same rotational angle φ for all of the synchronized measurement of uniformity data sets 240a to create a single average test tire uniformity data point at the rotational angle φ. This point-by-point averaging process is continued for all rotational angles φ to obtain the average test tire uniformity data set 245a, which is illustrated as an average test tire uniformity signal 615 in FIG. 6. Repeating features can be seen, including a maximum signal value 652 that corresponds to the first measurement maximum signal value 352, and a minimum signal value 654 that corresponds to the first measurement minimum signal value 354. The point-by-point averaging process of step 8 (245) enhances the tire contribution to the measurement of uniformity data 215a, 225a, and minimizes the machine contribution. This is because the measurement data synchronization of step 7 (240) aligns the tire signals in each measurement, while the machine contribution parts of the data are randomly distributed. The resultant average test tire uniformity data comprises an average tire-only signal for the test tire 116 wherein the machine contribution is averaged out.

Given a sufficient number of repeated measurements of tire uniformity 225a, the average test tire uniformity data 245a (e.g., signal 615), is an accurate measurement of uniformity (with significantly reduced noise and machine contribution effects) for the single test tire 116 obtained without directly quantifying the machine contribution of the TUM 110 on which the test was conducted. Furthermore, the test tire 116 is well characterized and suitable for comparison of tire uniformity measurements of the test tire 116 as made on multiple TUMs. Although the steps 1 through 8 of the inventive method 200 could be used to produce highly accurate measurements of tire uniformity for each tire of a group of tires, in practice this is not practical for measuring production tire uniformity due to the length of time required to obtain the multiple repeated measurements of tire uniformity 225a. Therefore the method 200 preferably continues with steps 9 through 10 in order to determine an average machine contribution data set 255a; and then utilizes the average machine contribution data 255a in steps 11 to 13 to produce corrected production tire uniformity data 270a obtained from a single measurement of fire uniformity on the production tire.

In step 9, for each of the repeated measurement data sets 225a, the angular shift data 235a is used to synchronize the average test tire uniformity data set 245a with one of the repeated measurement data sets 225a, and then use point-by-point subtraction to subtract the synchronized average test tire uniformity data set 245a from the one of the repeated measurement data sets 225a to obtain a machine contribution data set 250a for the one of the repeated measurement data sets 225a. Since the average test tire uniformity data set 245a is automatically synchronized with the first measurement of uniformity data 215a, no further synchronization is required (angular shift is zero), and point-by-point subtraction can be used to also determine a machine contribution data set 250a for the first measurement of uniformity. For example, FIG. 7 illustrates the first measurement signal 315 and a synchronized average test tire uniformity signal 615', which happens to be identical to the test tire uniformity signal 615 illustrated in FIG. 6 because the angular shift $AS_2$ is zero degrees for the first measurement of uniformity data 215a. The differences between the two signals 315 and 615', i.e., a machine contribution data set 250a determined by point-by-point subtraction, are due to both measurement noise and machine contribution. FIG. 8 illustrates a machine contribution signal 885 that results from subtracting the synchronized average test tire uniformity signal 615' from the first measurement signal 315.

In step 10 (255), all of the machine contribution data sets 250a (e.g., signal 885) are averaged together to determine an average machine contribution data set 255a. FIG. 9 illustrates an average machine contribution signal 980 that was obtained in this way. By averaging together a sufficient number of machine contribution data sets 250a, the machine contribution is enhanced and the measurement noise (randomly occurring) is averaged out. An example of the effect of random measurement noise can be seen by comparing the machine contribution signal 885 to the average machine contribution signal 980.

Steps 11 through 13 of the inventive method 200 illustrate how to apply the average machine contribution data 255a to correct a production tire uniformity measurement by removing the machine contribution of the TUM 110 on which the production tire is measured.

In step 11 (260), a production tire 116' of the same construction as the test tire 116 is mounted on the same tire uniformity machine that was used for steps 1–10 with the test tire 116. As with the test tire 116 in steps 1 and 3, the production tire 116' is mounted at a random angular position with respect to the rim reference mark 131.

In step 12 (265), the tire uniformity machine 110 is operated to collect a single set of tire uniformity data for the production tire 116', resulting in the production tire measurement is of uniformity data 265a. The uniformity data 265a is collected in the usual way, with the time zero measurement being triggered by the rim reference mark 131.

In step 13 (270), the machine contribution is removed from the production tire measurement of uniformity data 265a to yield a corrected production tire uniformity data set 270a. Step 13 (270) is accomplished by a calculation wherein the average machine contribution data 255a is point-by-point subtracted from the production tire measurement of uniformity data 265a. FIG. 10 illustrates an example of the calculations of step 13 (270). The first measurement of uniformity data 215a, plotted in FIG. 10 as the first measurement signal 315, was measured on the test tire 116 and is representative of a single measurement of uniformity on a production tire 116' (i.e., the test tire data set 215a can be used as an example of the production tire data set 265a). When the average machine contribution signal 980 (FIG. 9) is subtracted from the measurement of uniformity signal 315, a corrected tire uniformity signal 1015 results as shown in FIG. 10, and this is exemplary of a plot of the corrected production tire uniformity data 270a.

It may be noted that the corrected tire uniformity signal 1015 in FIG. 10 is slightly different in shape than the synchronized average test tire uniformity signal 615' (FIG. 7), although ideally they would be identical signals since they were determined from the same first measurement signal 315 for the same test tire 116 on the same TUM 110. The signal differences are due to the effects of random measurement noise. For the determination of the synchronized average test tire uniformity signal 615', both machine contribution and random measurement noise are averaged out because a plurality of measurements of tire uniformity are averaged together according to the inventive method 200 that also randomizes the machine contribution so that it can be averaged out along with the inherently random measurement noise. For the determination of the corrected tire uniformity signal 1015, the machine contribution (only, since it is determined from averages) is subtracted out of a single measurement of tire uniformity (e.g., first measurement signal 315). It is well known from statistics that the contribution of random measurement noise can not be determined by a single measurement. The corrected production tire uniformity data 270a could be improved by making multiple measurements of tire uniformity (e.g., repeating steps 11–12). But for practical reasons of productivity the typically minor errors due to random measurement noise are generally considered acceptable.

To continue the method 200 of this invention for additional production tires 116', steps 11 (260) through 13 (270) are performed for each additional production tire 116'. It is understood that the corrected tire uniformity data 270a of a significant number of production tires 116' can be measured using only steps 11 (260) through 13 (270) before it will be periodically necessary to perform steps 1 (210) through 10 (255) in order to re-determine the average machine contribution data 255a. It is assumed that well-known statistical methods will be employed to discern when it is necessary to so re-determine the average machine contribution data 255a. Preferably the statistical method will determine a number of production tires 116' that can be measured in sequence, and after the so-determined number of production tire measurements, the next production tire 116' can be used as the test tire 116 for a periodic re-determination of the average machine contribution data 255a.

It is anticipated that the steps of the method 200 of this invention will be implemented using digital computer technology wherein measurement signals are interpreted and stored, calculations are performed, and optional corrective control actions are processed in digitized forms in an arithmetic operation circuit such as the computer 126.

The invention has been described with reference to a preferred embodiment. Modifications and alterations may occur to others upon a reading and understanding of the specification. It is intended by the applicant to include all such modifications and alterations insofar as they come within the scope of the appended claims or the equivalents thereof.

What is claimed:

1. A method to identify and remove a machine contribution from tire uniformity measurements made on a tire uniformity machine (110) which subjects a tire (116, 116') to normal conditions of mounting, inflation, load and rotational speed while measuring and collecting tire uniformity measurement data with respect to a rim reference mark (131), the method characterized by the steps of:

step 1: mounting a tire on the tire uniformity machine at a random angular position with respect to the rim reference mark;

step 2: collecting tire uniformity data to record a first measurement of uniformity data set;

step 3: re-mounting the same tire on the tire uniformity machine at a random angular position with respect to the rim reference mark;

step 4: collecting tire uniformity data to record a repeated measurement of uniformity data set;

step 5: determining if additional measurements of uniformity are required for the tire, then looping back to repeat steps 3 through 5 if additional measurements of uniformity are determined to be required, but proceeding to step 6 when it is determined that additional measurements of uniformity are not required;

step 6: calculating cross-correlation functions and using them to determine angular shifts between the first measurement data set and each of the repeated measurement data sets;

step 7: using the angular shifts to synchronize each repeated measurement data set with the first measurement data set to yield synchronized measurement of uniformity data sets; and step 8: averaging together the first measurement of uniformity data and all of the synchronized measurement of uniformity data sets to yield an average tire uniformity data set that has minimized both random measurement noise and machine contribution errors in the measurement of uniformity data for the tire.

2. The method of claim 1, wherein the step 5 is further characterized by:
determining a required quantity of additional measurements of uniformity for the tire by quantifying and using knowledge of a random variability of tire uniformity measurements through statistical analysis of multiple repeated measurements of tire uniformity on the tire uniformity machine.

3. The method of claim 1, wherein the step 5 is further characterized by:
determining a required quantity of additional measurements of uniformity for the tire by specifying the required quantity as a fixed quantity in the range of 20 to 50.

4. The method of claim 1, further characterized by:
storing and interpreting the measurement of uniformity data, performing calculations, and processing corrective actions in digitized forms in an arithmetic operation circuit.

5. The method of claim 1, wherein:
the steps in the method of claim 1 are performed using a test tire for the tire, the test tire being selected to be representative of a group of tires to be measured on the tire uniformity machine, the method being characterized by the additional steps of:

step 9: using the angular shifts to synchronize the average test tire uniformity data set with each of the repeated measurement of uniformity data sets, and then subtracting to determine the machine contribution in each test tire measurement of uniformity data set to yield machine contribution data sets;

step 10: averaging together all of the machine contribution data sets to yield an average machine contribution data set for the test tire;

step 11: mounting a group tire from the group of tires on the tire uniformity machine at a random angular position with respect to the rim reference mark;

step 12: collecting tire uniformity data to record a group tire measurement of uniformity data set; and step 13: subtracting the average machine contribution data set from the group tire measurement of uniformity data set, thereby determining a corrected group tire uniformity data set for the group tire which is free of machine contribution.

6. The method of claim 5, wherein the step 5 is further characterized by:
determining a required quantity of additional measurements of uniformity for the test tire by quantifying and using knowledge of a random variability of tire uniformity measurements through statistical analysis of multiple repeated measurements of tire uniformity on the tire uniformity machine.

7. The method of claim 5, wherein the step 5 is further characterized by:
determining a required quantity of additional measurements of uniformity for the test tire by specifying the required quantity as a fixed quantity in the range of 20 to 50.

8. The method of claim 5, further characterized by:
storing and interpreting the measurement of uniformity data, performing calculations, and processing corrective actions in digitized forms in an arithmetic operation circuit.

9. The method of claim 5, wherein the step 6 is further characterized by:
determining each angular shift from a rotational angle of a peak position of each cross-correlation function.

10. The method of claim 5, further characterized by:
storing the average machine contribution data set that was determined for the test tire; and
determining corrected group tire uniformity data sets for additional group tires by repeating for each additional group tire a series of steps comprising the step 11, the step 12, and the step 13.

11. The method of claim 10, further characterized in that:
the group tire is one in a group of production tires.

12. The method of claim 11, further characterized by:
selecting the test tire from the group of production tires.

13. The method of claim 12, further characterized by the step of:
periodically re-determining the average machine contribution data by selecting the test tire from a current group of production tires; and by repeating a group of steps comprising the step 1 through the step 10.

14. The method of claim 5, further characterized by:
selecting the test tire such that it has the same tire construction as the group of tires to be measured on the tire uniformity machine.

15. A method for accurately determining a machine contribution of error in tire uniformity measurements made on a tire uniformity machine which subjects a tire to normal conditions of mounting, inflation, load and rotational speed while measuring and collecting tire uniformity measurement data with respect to a rim reference mark, the method characterized by the steps of:

step 1: mounting a tire on the tire uniformity machine at a random angular position with respect to the rim reference mark;

step 2: collecting tire uniformity data to record a first measurement of uniformity data set;

step 3: re-mounting the same tire on the tire uniformity machine at a random angular position with respect to the rim reference mark;

step 4: collecting tire uniformity data to record a repeated measurement of uniformity data set;

step 5: determining if additional measurements of uniformity are required for the tire, then looping back to repeat steps 3 through 5 if additional measurements of uniformity are determined to be required, but proceeding to step 6 when it is determined that additional measurements of uniformity are not required;

step 6: calculating cross-correlation functions and using them to determine angular shifts between the first measurement data set and each of the repeated measurement data sets;

step 7: using the angular shifts to synchronize each repeated measurement data set with the first measurement data set to yield synchronized measurement of uniformity data sets;

step 8: averaging together the first measurement of uniformity data and all of the synchronized measurement of uniformity data sets to yield an average tire uniformity data set that has minimized both random measurement noise and machine contribution errors in the measurement of uniformity data for the tire;

step 9: using the angular shifts to synchronize the average tire uniformity data set with each of the repeated measurement of uniformity data sets, and then subtracting to determine the machine contribution in each tire measurement of uniformity data set to yield machine contribution data sets; and step 10: averaging together all of the machine contribution data sets to yield an average machine contribution data set for the tire, wherein tire uniformity data has been subtracted out, and random measurement noise has been averaged out to yield a data set that accurately represents the machine contribution of error in tire uniformity measurements performed on the tire uniformity machine.

16. The method of claim 15, characterized in that:

the steps in the method are performed using a test tire for the tire, the test tire being selected to be representative of a group of tires to be measured on the tire uniformity machine.

17. The method of claim 16, further characterized by:

selecting the test tire such that it has the same tire construction as the group of tires to be measured on the tire uniformity machine.

18. The method of claim 15, wherein the step 5 is further characterized by:

determining a required quantity of additional measurements of uniformity for the tire by quantifying and using knowledge of a random variability of tire uniformity measurements through statistical analysis of multiple repeated measurements of tire uniformity on the tire uniformity machine.

19. The method of claim 15, wherein the step 5 is further characterized by:

determining a required quantity of additional measurements of uniformity for the tire by specifying the required quantity as a fixed quantity in the range of 20 to 50.

20. The method of claim 15, further characterized by:

storing and interpreting the measurement of uniformity data, performing calculations, and processing corrective actions in digitized forms in an arithmetic operation circuit.

* * * * *